United States Patent
Romanowski et al.

(10) Patent No.: US 6,233,238 B1
(45) Date of Patent: May 15, 2001

(54) METHOD FOR UPDATING CLOCK REFERENCES IN A DIGITAL DATA STREAM AND A REMULTIPLEXER

(75) Inventors: Alexander Romanowski, Hildesheim; Wilhelm Vogt, Lichtenau, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 08/971,079

(22) Filed: Nov. 14, 1997

(30) Foreign Application Priority Data

Nov. 14, 1996 (DE) .............................................. 196 47 093

(51) Int. Cl.[7] .............................. H04L 12/56; H04L 7/00; H04J 3/06; H04N 7/12
(52) U.S. Cl. ......................... 370/389; 370/512; 348/423; 348/512; 375/368; 375/376
(58) Field of Search ..................................... 370/503–506, 370/395, 394, 389, 397, 464–468, 473, 474, 476, 512; 375/354, 362, 368, 371, 372, 376; 348/423, 500, 518, 512

(56) References Cited

U.S. PATENT DOCUMENTS

| | | | |
|---|---|---|---|
| 5,467,342 | * | 11/1995 | Logston et al. .......................... 370/17 |
| 5,537,408 | * | 7/1996 | Branstad et al. ......................... 370/79 |
| 5,566,174 | * | 10/1996 | Sato et al. ............................... 370/84 |
| 5,598,415 | * | 1/1997 | Nuber et al. ........................... 370/474 |
| 5,612,981 | * | 3/1997 | Huizer .................................... 375/376 |
| 5,784,119 | * | 7/1998 | Node et al. ............................. 348/512 |
| 5,805,602 | * | 9/1998 | Cloutier et al. ........................ 370/516 |
| 5,835,493 | * | 11/1998 | Magee et al. ........................... 370/394 |
| 5,901,149 | * | 5/1999 | Itakura et al. .......................... 370/468 |

* cited by examiner

*Primary Examiner*—Alpus H. Hsu
*Assistant Examiner*—Duc Ho
(74) *Attorney, Agent, or Firm*—Fulbright & Jaworski, LLP

(57) ABSTRACT

A method and system for updating clock references in a digital data stream is proposed, wherein all clock references present in the data stream are updated by means of a single system clock. A time recovery unit compares time $t_{pcr}$ transported in the clock reference (PCR) with the time of the system clock $t_{clock}$ and stamps the difference ($t_{clock}-t_{pcr}$) of the two times into the clock reference. After remultiplexing, a stamping unit reads out the time difference ($t_{clock}-t_{pcr}$) of the two times from the time stamp, subtracts it from the actual time in the system clock and stamps the value ($t_{pcr}+d$) into the clock reference. Due to similarities in operation, the time recovery unit and stamping unit may share common circuitry.

8 Claims, 1 Drawing Sheet

1

METHOD FOR UPDATING CLOCK REFERENCES IN A DIGITAL DATA STREAM AND A REMULTIPLEXER

FIELD OF THE INVENTION

The invention is based on a method for updating of clock references in a digital data stream as well as on a remultiplexer operating by this method according to the category of the independent claims.

According to MPEG2 specifications, IEC 13818-1, 1994, page 24 ff, it is known that each information data program stream coded according to this method has assigned to it a program clock reference (PCR) data field. This PCR contains an individual clock reference that is specific to a certain information data packet or program. The MPEG data stream is transmitted from the data source to the data sink together with the clock references. The clock references are used on the receiver side for time recovery and pulse synchronization. An update of the PCR is necessary at every action upon the data stream, whether due to change of data rate or a change in the data packet sequence on the way from data source to data sink. In a data stream, a multiple program transport stream (MPTS), any number of PCRs assigned to them may also be present.

DESCRIPTION OF THE PRIOR ART

PCRs in remultiplexers known to date are updated by means of a system clock for each individual PCR. These clocks must be synchronized with each other over a phase locked loop (PLL) and be adjustable. The cost for updating the PCR units for each program is high and it greatly limits flexibility as regards the number of programs.

SUMMARY OF THE INVENTION

The method according to the invention has, on the other hand, the advantage that all clock references present in the data stream can be updated by means of a single time pulse of a single system clock. It is advantageous that in this method no subsequent adjustment is needed, and a PLL circuit is unnecessary.

Other steps described herein allow for advantageous further embodiments and improvements of the method for updating of clock references.

It is of advantage that, in time recovery, the clock reference is read out and the read-out out time is compared to the time in the system clock. In an advantageous manner the difference of the two times is stamped into, i.e., written over, the field of the previously read clock reference.

In the further execution of the method, after the remultiplexing of the data stream, the clock reference in the stamp unit which was updated in a first step is read and compared to the system clock time which time is shifted by a delay time d. The result of this comparison contains a time shifted by a delay time d which is stamped into the clock reference field.

The remultiplexer according to the invention has the advantage that every time pulse recovery and every time stamp unit has a connection to a single system clock. This removes unnecessary circuits and connections to individual clocks which update the clock references in the program stream.

BRIEF DESCRIPTION OF THE DRAWINGS

An embodiment of the invention is represented in the drawing and explained in more detail in the subsequent description.

DESCRIPTION OF THE EMBODIMENT

Figure 1:
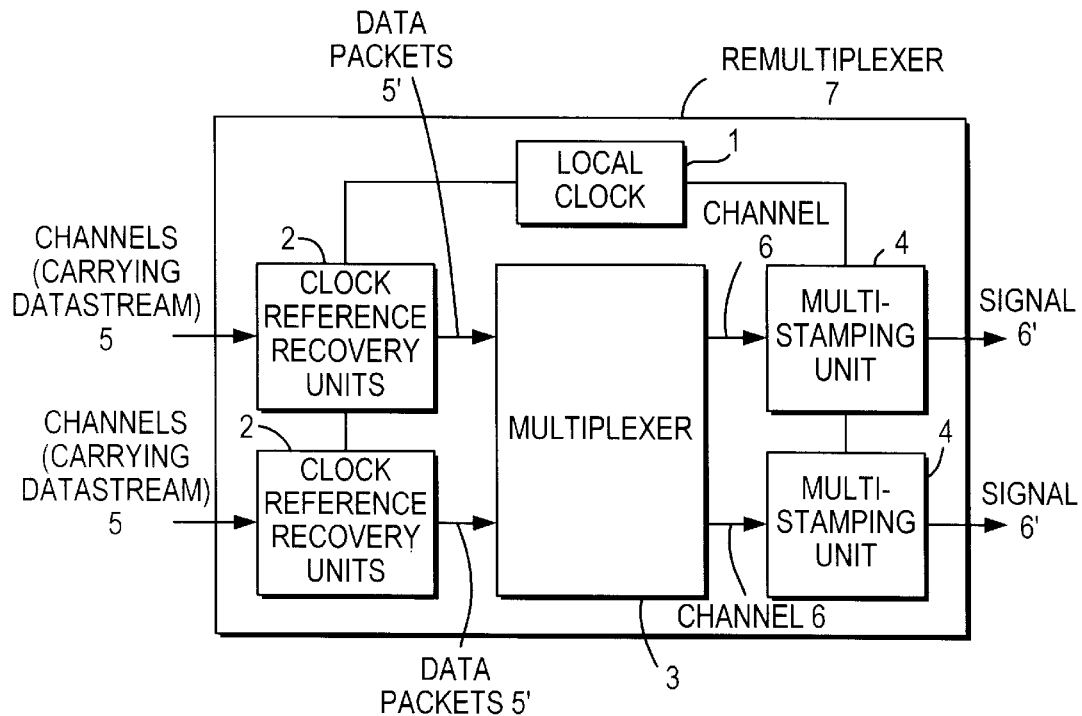
FIG. 1 shows schematically a remultiplexer.

FIG. 1 represents a remultiplexer unit as required when using the MPEG-2 method if changes are to occur within a data stream. Such a change can be a change of the data rate, e.g., ending of a program part, or a reconfiguration of the programs which the program supplier, for example, wishes to transmit on a different channel. In the example shown in FIG. 1, the data stream, the MPTS, is sent over both channels 5 into the remultiplexer 7. There, they are evaluated in the clock reference recovery units 2 (multirecovery). For that purpose, first it is checked whether the presently arriving data packet contains a PCR clock reference. This is done by evaluating the packet header containing the PCR flag. If the flag is present the clock reference is read and its value compared with the current time of the local clock 1. In the multirecovery unit 2 a new value, i.e. the difference of the two clock references $t_{clock}-t_{pcr}$ is stamped into the PCR clock reference, i.e., placed in the PCR reference field. The data packets 5' with clock reference variation leave the multirecovery units and are fed into the multiplexer unit 3. There the actual remultiplexing of the data streams takes place. The data leave the multiplexing unit through the channel 6 and arrive at the multistamping unit 4. In this unit the packet header is first once again checked for the PCR flag, and then, if clock references are present, the difference between the actual time and the local clock $(t_{clock}+d)$ and the transmitted clock reference variable $(t_{clock}-t_{pcr})$ is formed. The result $[(t_{clock}+d)-(t_{clock}-t_{pcr})]$ is the time $t_{pcr}$ plus the delay time d which was used to further process the data packet in the multiplex unit. This updated clock reference is subsequently again stamped into the same packet.

Figure 2:
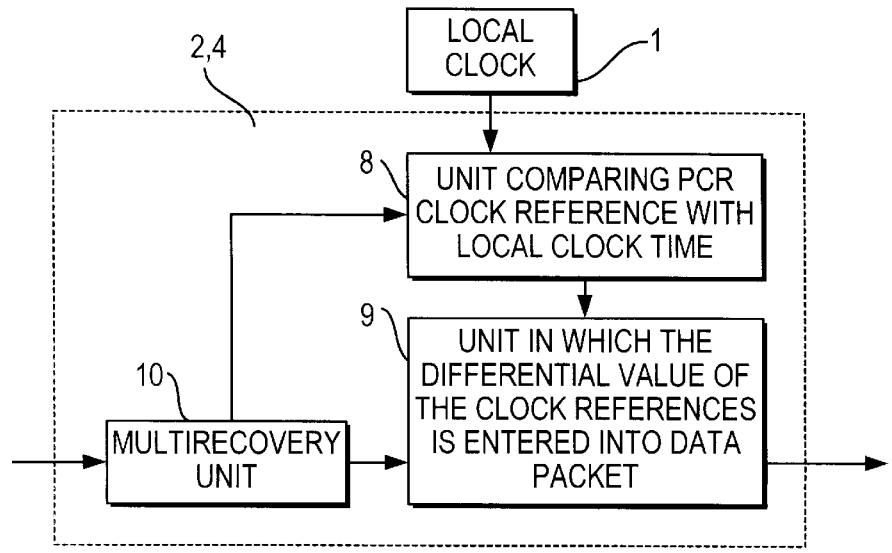
FIG. 2 shows a block diagram of a time pulse recovery or stamp unit.

The multistamping unit 4, as well as the multirecovery unit 2, are again represented in FIG. 2. The input signal, which in the case of the multirecovery unit consists of the actual data signal, is first read (10). If a PCR clock reference is found in the unit 10, it is compared in unit 8 with the local time of clock 1. In unit 8 the value $t_{clock}-t_{pcr}$ is calculated. Subsequently, in 9 the differential value of the clock references is entered into the data packet. The data packet leaves the unit 9 through the data exit which in the case of the multirecovery unit leads to the multiplex unit 3. The method is analogous for the multistamping unit 4. Here, the signal arrives from the multiplexer 3 and leaves the entire remultiplexer unit as signal 6'. Both in the multirecovery unit and in the multistamping unit, the headers are analyzed, the clock references are read and the clock reference variables are stamped. Therefore both the multirecovery and the multistamping unit can use the same components, which reduces the cost of the remultiplexer.

MPEG specifications have set the maximum PCR tolerance which can be created by multiplexing of the data stream at ±500 ns, which corresponds to 13.5 system pulses. A 27 Mhz system clock should have a tolerance of 30 ppm (±810 Hz). A tolerance of 30 ppm is to be assumed for the local clock as well. The frequencies of the two clocks can therefore differ by a maximum of 1620 Hz, i.e. the two clocks can drift apart in about 8.3 ms by the allowed value of 13.5 system pulses. Assuming a bit rate of 30 Mbit/s this corresponds to a maximum delay of approximately 250,000 bits, i.e. 166 transport packets of the 188 bit length or 153 transport packets of the 204 bit length. This value can be improved by increasing the precision of the local clock.

What is claimed is:

1. A method for processing a digital data stream in a remultiplexing unit, said data stream having a plurality of information data packets each having a respective assigned program clock reference field, said method comprising:

reading a time $t_{pcr}$ from said program clock reference fields in the data stream through a recovery unit; and comparing the time $t_{pcr}$ transmitted in the program clock reference field with a time $t_{clock}$ of the system clock to obtain a clock reference variable equal to the difference $t_{clock}-t_{pcr}$, placing the clock reference variable in the program clock reference field; remultiplexing said information data packets after said clock reference variable is placed in said program clock field, reading the clock reference variable from the program clock reference field after remultiplexing, subtracting said clock reference variable from a current time derived from the system clock, said current time constituting the time $t_{block}$ plus a processing time delay, d, to obtain a value $t_{pcr}+d$, and placing the value $t_{pcr}+d$ into the program clock reference field; thereby updating said program clock reference fields.

2. A method for updating a program clock reference of a program in a remultiplexing unit, said remultiplexing unit having a system clock generating a local time value and a remultiplexer, said method comprising the following sequential steps:

(1) reading a value $t_{pcr}$ of a program clock reference field in a program;

(2) replacing the value $t_{pcr}$ in the program clock reference field with a clock reference variable equal to a local time value $t_{clock}$ derived from the system clock minus the program clock reference value $t_{pcr}$;

(3) transmitting the program to the remultiplexer, (4) reading the clock reference variable of the program clock reference field; and (5) replacing the clock reference variable in the program clock reference field with a new value equal to a current time, said current time constituting the time $t_{clock}$ plus a processing time delay, d, from said system clock minus the clock reference variable read from the program clock reference field in step (4).

3. A method for updating program clock references according to claim 2, wherein steps (2) and (5) are both performed by the same circuitry.

4. A remultiplexer for processing a digital data stream comprising a plurality of programs each having a respective assigned program clock reference, said remultiplexer comprising:

a time recovery portion for retrieving a time value from one of said program clock references and for comparing said time value to a time value of a system clock to calculate a clock reference variable equal to the difference between said two time values;

a time stamping portion for stamping a calculated time value in one of said program clock references; and an updating portion for updating said program clock references with said calculated time value based on a time pulse of a system clock;

said time recovery portion, said updating portion, and said time stamping portion each having a connection to the system clock.

5. A remultiplexer according to claim 4, wherein said time recovery portion and said time stamping portion share a common circuit portion.

6. A remultiplexer for processing a digital data stream comprising a plurality of data packages each with respective assigned program clock reference, said remultiplexer comprising:

a plurality of time recovery units each receiving at least one of said data packages and retrieving a time value from the program clock reference thereof and each comparing its respective program clock reference time value to a time value of a system clock to calculate a clock reference variable equal to the differences between said two time values;

a plurality of time stamping units for stamping a calculated time value in one of said program clock references; and at least one updating unit for updating said program clock references with said calculated time value based on a time pulse of a system clock;

wherein the system clock is connected to each of said time recovery units, said updating unit, and said time stamping units.

7. A remultiplexing unit for processing a digital data stream comprising a plurality of programs each having a program clock reference field, said remultiplexing unit comprising:

a system clock generating values representing the current time;

a recovery unit receiving at least one of said programs, said recovery unit reading a value $t^{PCR}$ from the program clock reference field, and replacing the value tpc of the program clock reference field with a clock reference variable equal to a time value $t_1$ of the system clock minus the read program clock reference value $t_{PCR}$, a remultiplexer receiving said program from said recovery unit; and a stamping unit receiving the program from the remultiplexer, said stamping unit reading the clock reference variable value $t_1-t_{PCR}$ from the program clock reference field and replacing said value with a value derived from the system clock plus a processing time delay, d, minus the clock reference variable value $t_1-t_{PCR}$.

8. A remultiplexing unit according to claim 7, wherein said time recovery unit and said time stamping unit share a common circuit portion.

* * * * *

UNITED STATES PATENT AND TRADEMARK OFFICE
CERTIFICATE OF CORRECTION

PATENT NO. : 6,233,238 B1
DATED : May 15, 2001
INVENTOR(S) : Romanowski et al.

It is certified that error appears in the above-identified patent and that said Letters Patent is hereby corrected as shown below:

Column 3,
Line 20, change "$t_{block}$" to -- $t_{clock}$ --.

Column 4,
Line 40, change "$t^{pcr}$" to -- $t_{pcr}$ --.
Line 41, change "tpc" to -- $t_{pcr}$ --.

Signed and Sealed this

Fifth Day of March, 2002

Attest:

JAMES E. ROGAN
*Attesting Officer*  *Director of the United States Patent and Trademark Office*